United States Patent [19]
Handlogten

[11] Patent Number: 5,943,249
[45] Date of Patent: Aug. 24, 1999

[54] METHOD AND APPARATUS TO PERFORM PIPELINED DENORMALIZATION OF FLOATING-POINT RESULTS

[75] Inventor: Glen Howard Handlogten, Rochester, Minn.

[73] Assignee: International Business Machines Corporation, Armonk, N.Y.

[21] Appl. No.: 08/843,081

[22] Filed: Apr. 25, 1997

[51] Int. Cl.[6] .................................................. G06F 7/52
[52] U.S. Cl. ...................................................... 364/748.02
[58] Field of Search .................... 364/748.01, 748.02, 364/748.03, 748.04, 748.07, 748.09; 395/563

[56] References Cited

U.S. PATENT DOCUMENTS

| | | | |
|---|---|---|---|
| 5,053,987 | 10/1991 | Genusov et al. | 364/736.03 |
| 5,513,362 | 4/1996 | Urano et al. | 395/800 |
| 5,757,687 | 5/1998 | Naffziger et al. | 364/748.07 |
| 5,764,549 | 6/1998 | Bjorksten et al. | 364/715.04 |
| 5,768,169 | 6/1998 | Sharangpani | 364/748.07 |
| 5,808,926 | 9/1998 | Gorshstein et al. | 364/748.03 |

OTHER PUBLICATIONS

ANSI/IEEE, Std. 754–1985, "An American National Standard IEEE Standard for Binary Floating–Point Arithmetic," pp. 7–17.

E. Hokenek and R. K. Montoye, IBM J. Res. Develop., vol. 34, No. 1, Jan. 1990, "Leading–zero anticipator (LZA) in the IBM RISC System/6000 floating–point execution unit," pp. 71–77.

*Primary Examiner*—William M. Treat
*Attorney, Agent, or Firm*—Jack V. Musgrove; Andrew J. Dillon

[57] ABSTRACT

A method of processing a floating-point instruction (including a multiply-add instruction) in a floating-point processor. Prior-art techniques require prenormalization of intermediate results generated by the floating-point processor, but normalization can sometimes result in an underflow condition, which requires denormalizing the intermediate result. The present invention provides a method of determining an amount to shift the mantissa of the intermediate result to obtain a final result while avoiding ever producing an exponent that is out of range. The invention also allows denormalized numbers to be stored in the floating-point registers in a denormalized form. The method of determining the shift amount first requires a determination of whether both, or only one, of the product and adder operands are denormalized. If both are denormalized, then the shift amount is equal to the addend alignment amount. If, however, at least one of these values is normalized, then a leading zero overlay is used to derive the shift amount.

14 Claims, 4 Drawing Sheets

METHOD AND APPARATUS TO PERFORM PIPELINED DENORMALIZATION OF FLOATING-POINT RESULTS

BACKGROUND OF THE INVENTION

1. Field of the Invention

The present invention generally relates to computer systems and, more particularly, to a method of processing denormalized floating-point numbers.

2. Description of the Related Art

The basic structure of a conventional computer system 10 is shown in FIG. 1. The heart of computer system 10 is a central processing unit (CPU) or processor 12 which is connected to several peripheral devices, including input/output (I/O) devices 14 (such as a display monitor and keyboard) for the user interface, a permanent memory device 16 (such as a hard disk or floppy diskette) for storing the computer's operating system and user programs, and a temporary memory device 18 (such as random-access memory or RAM) that is used by processor 12 to carry out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor, and a memory controller may be used as an interface between temporary memory device 18 and processor 12. Computer system 10 also includes firmware 24 whose primary purpose is to seek out and load an operating system from one of the peripherals (usually permanent memory device 16) whenever the computer is first turned on.

A processor can perform arithmetic operations on different types of numbers, or operands. For example, the simplest operations involve integer operands, which are represented using a "fixed-point" notation. Non-integers are typically represented according to a "floating-point" notation. Standard number 754 of the Institute of Electrical and Electronics Engineers (IEEE) sets forth particular formats which are used in most modern computers for floating-point operations. For example, a "single-precision" floating-point number is represented using a 32-bit (one word) field, and a "double-precision" floating-point number is represented using a 64-bit (two-word) field. Most processors handle floating-point operations with a floating-point unit (FPU).

Floating-point notation (which is also referred to as exponential notation), can be used to represent both very large and very small numbers. A floating-point notation has three parts, a mantissa (or significand), an exponent, and a sign (positive or negative). The mantissa specifies the digits of the number, and the exponent specifies the magnitude of the number, i.e., the power of the base which is to be multiplied with the mantissa to generate the number. For example, using base 10, the number 28330000 would be represented as 2833E+4, and the number 0.054565 would be represented as 54565E−6. Since processors use binary values, floating-point numbers in computers use 2 as a base (radix). Thus, a floating-point number may generally be expressed in binary terms according to the form $$n=(-1)^S \times 1.F \times 2^E,$$

where n is the floating-point number (in base 10), S is the sign of the number (0 for positive or 1 for negative), F is the fractional component of the mantissa (in base 2), and E is the exponent of the radix. In accordance with IEEE standard 754, a single-precision floating-point number uses the 32 bits as follows: the first bit indicates the sign (S), the next eight bits indicate the exponent offset by a bias amount of 127 (E+bias), and the last 23 bits indicate the fraction (F). So, for example, the decimal number ten would be represented by the 32-bit value 0 10000010 01000000000000000000000 as this corresponds to $(-1)^0 \times 1.01_2 \times 2^{130-127} = 1.25 \times 2^3 = 10$.

When a value is expressed in accordance with the foregoing convention, it is said to be normalized, that is, the leading bit in the significand is nonzero, or a "1" in the case of a binary value (as in "1.F"). If the explicit or implicit most significant bit is zero (as in "0.F"), then the number is said to be unnormalized. Unnormalized numbers can easily occur as an output result of a floating-point operation, such as the effective subtraction of one number from another number that is only slightly different in value. The fraction is shifted left (leading zeros are removed from the fraction) and the exponent adjusted accordingly; if the exponent is greater than or equal to $E_{min}$ (the minimum exponent value), then the result is said to be normalized. If the exponent is less than $E_{min}$, an underflow has occurred. If the underflow is disabled, the fraction is shifted right (zeros inserted) until the exponent is equal to $E_{min}$. The exponent is replaced with "000" (hexadecimal), and the result is said to be denormalized. For example, two numbers (having the same small exponent E) may have mantissas of 1.010101 and 1.010010, and when the latter number is subtracted from the former, the result is 0.000011, an unnormalized number. If E<5, the final result will be a denormalized number.

The hardware of many conventional computers is adapted to process only normalized numbers. Therefore, when a denormalized number is presented as an output result of a floating-point operation, it must be normalized before further processing of the number can take place. Various techniques are used to normalize the values, generally by removing leading zeros from the fraction and accordingly decrementing the exponent. See U.S. Pat. No. 5,513,362. One technique involves leading zero anticipator (LZA) logic which predicts the number of zeros to remove before the floating-point arithmetic is completed. See IBM Journal of Research and Development, vol. 34, no. 1 (January 1990), pp. 71–77. Such normalization can, however, sometimes lead to an "underflow" exception. An underflow occurs when a result is presented whose absolute value is too small to be represented within the range of the numeration system. For example, in some prior-art floating-point systems, a number less than $1.0 \times 2^{Emin}$ cannot be represented, and a floating-point operation that results in a number smaller than this is rounded to zero. Underflows can lead to further exceptions, such as an attempt to divide by zero (an "overflow" exception). When an underflow trap is not enabled (typically the default case—also referred to as "underflow exception disabled"), the hardware is responsible for handling the underflow. Underflows may still occur, but the underflow "exception" is avoided. The exception would probably cause the job to end. When the exception is disabled, denormalized results are produced (some precision is lost), but the program keeps running.

In addition to normalizing denormalized results, i.e., removing leading zeros caused by the effective subtract operation, it is sometimes necessary to "prenormalize" input values, i.e., remove leading zeros from the source operands (A, B, and C). Prenormalization is usually required if A, B, or C is a denormalized number (a denormalized input number is changed to a number with an implicit bit equal to 1 and an exponent less than $E_{min}$).

In the IEEE implementation, when the underflow trap is not enabled (the default case), numbers smaller than 1.0× $2^{Emin}$ are not rounded to zero but, instead, must be represented as a denormalized number. In other words, if full normalization creates an underflow, i.e., by making the exponent a negative value, then a "denormalization" process must occur which replaces the negative exponent with zero, and shifts the fraction back to the right (adding leading zeros) by an amount that matches the size of the negative exponent. Denormalization is often referred to as a "gradual underflow." If the hardware is not capable of producing a denormalized number, control is handed over to software which produces the denormalized number, and then the hardware resumes processing, but no exception is signalled. If the hardware can produce a denormalized number on its own, then control is not passed to the software.

The foregoing approach to handling denormalized results has several disadvantages. In those situations where an underflow would occur, the prenormalization of the value is unnecessary to begin with, and so delays processing by using extra cycles for both prenormalization and denormalization. Also, subsequent instructions in the processor must be stalled while the hardware determines if an underflow will occur, negatively impacting "pipelined" operations. Pipelining is a technique of overlapping the execution of multiple instructions, and is critical to faster CPU performance in modern computers. It would, therefore, be desirable and advantageous to devise an improved method of handling denormalized results from floating-point operations, to avoid these unnecessary delays.

SUMMARY OF THE INVENTION

It is therefore one object of the present invention to provide an improved method of processing floating-point operations in a computer system.

It is another object of the present invention to provide such a method which more efficiently handles the processing of denormalized floating-point numbers.

It is yet another object of the present invention to provide such a method which normalizes unnormalized floating-point numbers only by the amount necessary, by providing additional information to the leading zero anticipator logic in order to handle those cases where full normalization is not required, and which performs the foregoing using simplified pipeline control logic.

The foregoing objects are achieved in a method of processing a multiply-add floating-point instruction in a floating-point processor, generally comprising the steps of calculating an intermediate result having a mantissa and an exponent, determining an amount to shift the mantissa of the intermediate result to obtain a final result, the shift amount being selected to always produce results that fully conform to the IEEE standard (including denormalized numbers as required) and shifting the mantissa by the shift amount and adding the shift amount to the exponent. The shift amount is selected to produce a normalized final result unless a normalized final result would produce an exponent less than $E_{min}$. Denormalized floating-point numbers can be stored in the floating-point registers, and are indicated as being denormalized by providing an exponent value of 001 (hexadecimal), with an implicit bit of zero and a nonzero fraction. If the product of the first two operands (A and C) is a denormalized floating-point number and the third operand (B) is a denormalized floating-point number, the determining step is accomplished by setting the normalization shift amount equal to the addend alignment amount which is calculated by taking the difference between the exponent of the intermediate product and an exponent of the third operand (addend). If not, however, then the determining step includes the step of selecting a leading zero overlay used to derive the shift amount, the leading zero overlay being based on the exponent of the product intermediate result. If the instruction set includes fused instructions (like multiply-add), then the size of the leading zero overlay (LZO) is twice the number of bits in the fractional portion of the format of the operands, e.g., a leading zero overlay for double-precision multiply-add operands has 106 bits. A 53-bit LZO would be sufficient for double-precision operands if fused instructions were not included. The leading zero overlay is used to derive the shift amount by combining the leading zero overlay in an OR construct with the sum and carry values that are associated with the product.

This method of handling denormalized numbers avoids the extra cycles used by unnecessary prenormalization, normalization, and then denormalization, and further avoids stalling subsequent instructions while the hardware determines if an underflow condition will occur, thereby improving processor performance for floating-point operations. It also removes the complexity associated with the above procedures.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
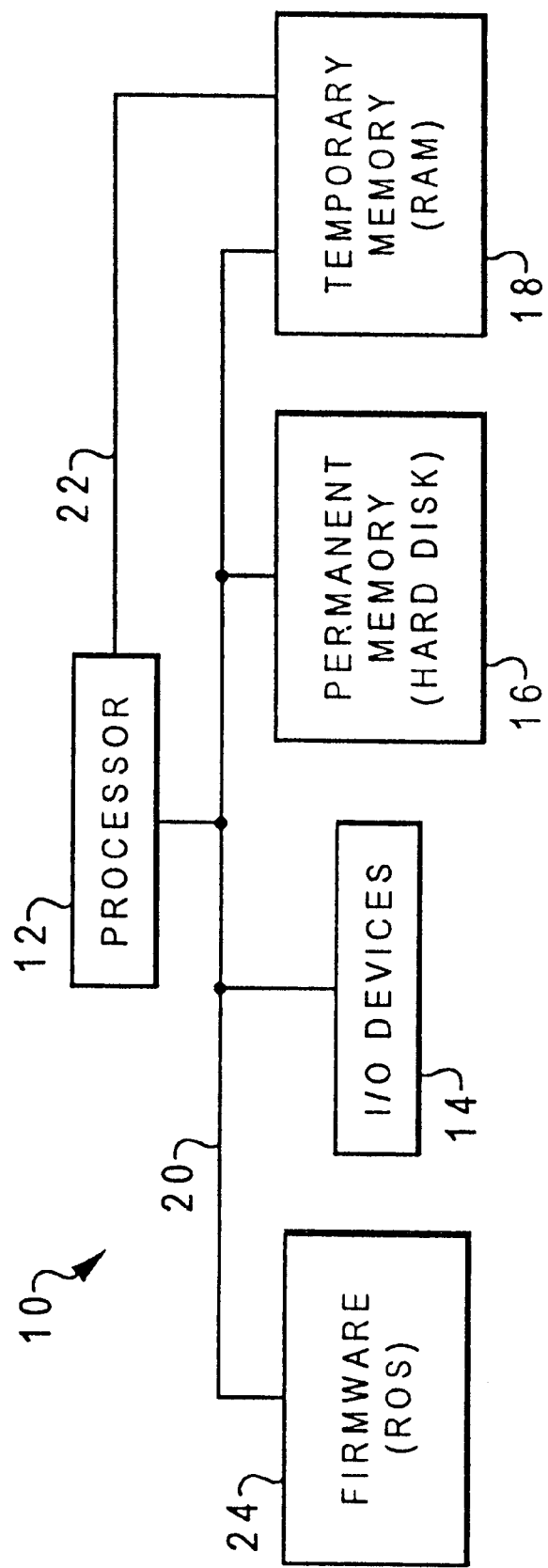
FIG. 1 is a block diagram of a conventional computer system.

The present invention is directed to a method of handling denormalized floating-point numbers in a processor of a computer system. The computer system's hardware may include the various components shown in FIG. 1, but the computer system is not necessarily conventional, i.e., it could include new hardware components as well, or have a novel interconnection architecture for existing components. Therefore, while the present invention may be understood with reference to FIG. 1, this reference should not be construed in a limiting sense.

Figure 2:
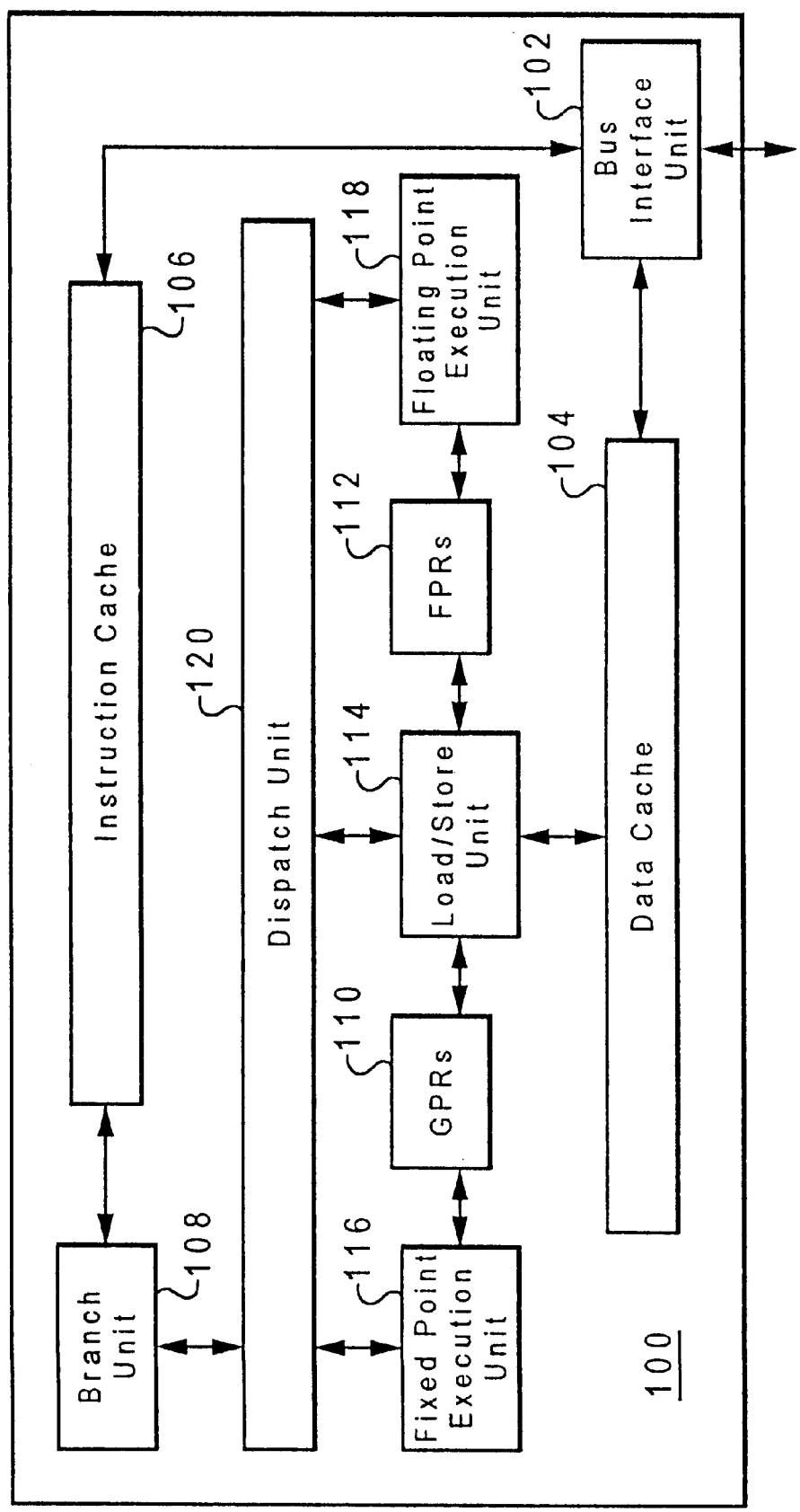
FIG. 2 is a block diagram of one embodiment of a processor in which the present invention may be implemented.

With further reference to FIG. 2, a block diagram of a processor in which a preferred embodiment of the present invention may be implemented is depicted. Processor 100 includes a bus interface unit 102 which controls the flow of data between processor 100 and the remainder of the data-processing system (not shown). Bus interface unit 102 is connected to both a data cache 104 and an instruction cache 106. Instruction cache 106 supplies instructions to branch unit 108, which determines what sequence of instructions is appropriate given the contents of general-purpose registers (GPRs) 110 and floating-point registers (FPRs) 112 in processor 100, the availability of load/store unit 114, fixed-point execution unit 116, and floating-point execution unit 118, and the nature of the instructions themselves. Branch unit 108 forwards the ordered instructions to dispatch unit 120, which issues the individual instructions to the appropriate execution unit (load/store unit 114, fixed-point execution unit 116, or floating-point execution unit 118).

Fixed-point execution unit 116 reads data from and writes data to general-purpose registers 110. Floating-point execution unit 118 reads data from and writes data to floating-point registers 112. Load/store unit 114 reads data from general-purpose registers 110, floating-point registers 112, and writes the data to data cache 104 or to an external memory (not shown) depending on the memory hierarchy and caching protocol employed by the data-processing system, which are beyond the scope of the present invention. Load/store unit 114 also reads data from data cache 104 and writes the data to general-purpose registers 110 and floating-point registers 112.

Those skilled in the art will appreciate that the details of either the construction of processor 100 or its operation may vary depending on the objectives influencing the design. For example, processor 100 may include register renaming multiple fixed-point execution units 116 for executing fixed-point instructions without data dependencies in parallel, or a memory management unit regulating the content of data cache 104 and a second level (L2) cache (not shown) outside processor 100.

Figure 3:
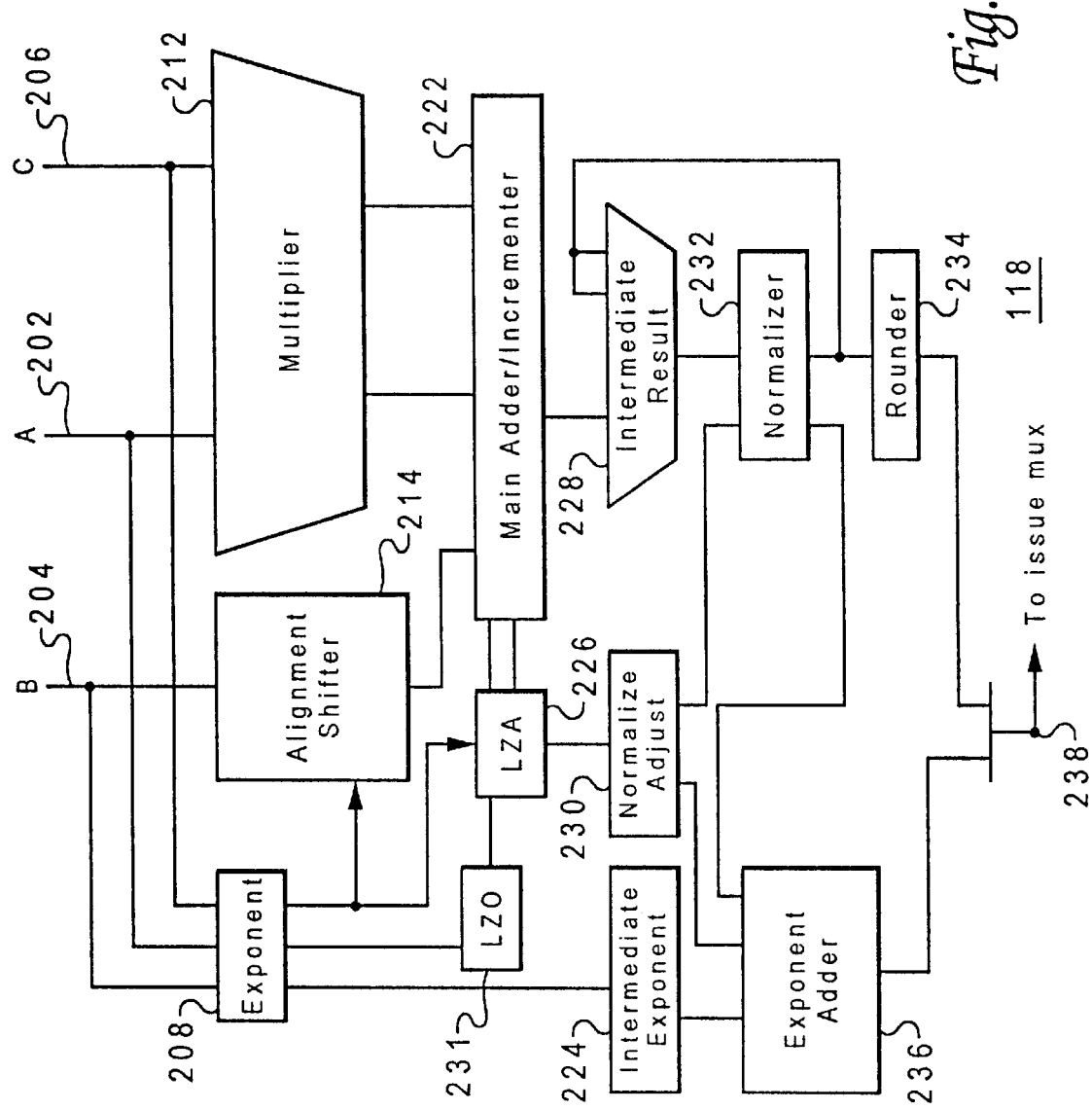
FIG. 3 is a block diagram of a floating-point execution unit constructed in accordance with a preferred embodiment of the present invention.

Referring to FIG. 3, a high-level block diagram of floating-point execution unit 118 is illustrated. Floating-point execution unit 118 includes three inputs 202, 204, and 206 for receiving input operands A, B, and C, respectively, expressed as floating-point numbers. Floating-point execution unit 118 uses these operands to perform a "multiply-add" instruction. The multiply-add instruction executes the arithmetic operation $\pm[(A \times C) \pm B]$. The exponent portions of operands A, B, and C received at inputs 202, 204, and 206 are provided to an exponent calculator 208. The mantissa portions of operands A and C are provided to a multiplier 212, while the mantissa portion of operand B is provided to an alignment shifter 214. As used herein, the term "adding" inherently includes subtraction since the B operand can be a negative number.

Multiplier 212 receives the mantissas of operands A and C and reduces the arithmetic function (A×C) to two intermediate results, known as "sum" and "carry." These intermediate results are provided to a main adder/incrementer 222. Exponent calculator 208 calculates an intermediate exponent from the sum of the exponents of operands A and C and stores the intermediate exponent in an intermediate exponent register 224. Exponent calculator 208 also calculates the difference between the intermediate exponent and the exponent of operand B, and decodes that value to provide control signals to both a leading zero anticipator (LZA) 226 and alignment shifter 214. Alignment shifter 214 shifts the mantissa of operand B so that the exponent of operand B, adjusted to correspond to the shifted mantissa, equals the intermediate exponent. The shifted mantissa of operand B is then provided to main adder/incrementer 222. Main adder/incrementer 222 adds the shifted mantissa of operand B to the sum and carry results of multiplier 212. The output of main adder/incrementer 222 is stored in an intermediate result register 228.

Simultaneously with the mantissa addition in main adder/incrementer 222, LZA 226 predicts the position of the leading one in the result. A conventional LZA, accurate to within +/– one-bit position, may be used, with the modifications noted further below. Recognizing that the source of error is overflow ("carrying" in addition operations and "borrowing" in subtraction operations), the inaccuracy of a prediction by leading zero anticipator 226 is reduced to one direction when logical addition and logical subtraction are taken into account. Since the nature of the arithmetic operation—logical addition or logical subtraction—is known well in advance, LZA 226 may predict the location of the leading one in the result mantissa as being in one of two adjacent bit positions. The left bit position, the most significant bit of the pair, is referred to as the "minimum position" as it represents the minimum shift required for normalization of the result mantissa. Similarly the right bit position, representing the maximum shift required for normalization, is referred to as the "maximum position." For example, if twelve zeroes were predicted to precede the centerpoint of the minimum/maximum bit position pair, the shift amount pair would be either (11,12) for logical addition or (12,13) for logical subtraction. Because the minimum-predicted shift amount must always be selected to ensure that a leading one is not removed from the result, the shift amount used is always based on an encoding of the minimum position of the predicted bit position pair.

LZA 226 computes a normalize adjust based on the minimum bit position, which is stored in a normalize adjust register 230. The normalize adjust from normalize adjust register 230 is provided, together with the intermediate result mantissa from intermediate result register 228, to a normalizer 232. Normalizer 232 performs the shifting required to place the leading one in the most significant bit position of the result mantissa. The shifted mantissa is then provided to a rounder 234, which rounds-off the result mantissa to the appropriate number of bits.

The normalize adjust from normalize adjust register 230 is also provided to an exponent adder 236. To obtain the proper exponent, the exponent is initially adjusted to correct for the maximum shift predicted by leading zero anticipator 226. If the final result of main adder/incrementer 222 requires only the minimum shift, a late "carry-in" to the exponent adder corrects for the minimum shift amount. To adjust the exponent for the maximum shift predicted, the two's complement of the maximum bit position is added to the intermediate exponent. The addition of the exponent adjust to the intermediate exponent may be initiated as soon as the exponent adjust is available from leading zero anticipator 226, which will typically be before the result from main adder/incrementer 222 becomes available.

The final result mantissa from rounder 234 is combined with the final exponent from exponent adder 236 and forwarded, at output 238, to a result bus (not shown) of floating-point execution unit 118. From the floating-point execution unit's issue multiplexer, the normalized floating-point result may be directly written to a floating-point register or, alternatively, to a designated entry in a rename buffer.

As explained above in the Description of the Related Art, if denormalized operands are prenormalized before operating on them, it is difficult to handle disabled underflows (which require denormalization at completion). Therefore, floating-point execution unit 118 includes a novel construction which prenormalizes operands only when necessary (e.g., for seed table accesses like square root and divide operations). All denormalized numbers are held in the floating-point registers 112 in denormalized form (with their implicit bits). The exponent of a denormalized number is chosen to be 001 (hexadecimal), as opposed to the IEEE standard which would dictate an exponent of 000. To implement this technique, floating-point operations are divided into two classes: (1) operations wherein both the operand B is denormalized and the intermediate product A×C exponent is negative; or (2) any other case.

In the latter case, where at least one of the values is normalized, a leading zero overlay (LZO) is generated by logic unit 231, as explained below, that may prevent the LZA from requesting full normalization. The LZO is based on the intermediate exponent stored in intermediate exponent register 224. The LZO has twice as many bits as are used for the fractional part of the floating-point number (because of the compound fused nature of the multiply-add instruction). For example, a double-precision floating-point number uses 53 bits to represent the fraction (F), so the LZO for a double-precision number has 106 bits. This bit size is also the same as the total number of bits in the sum and carry inputs to main adder 222. The LZO is basically constructed by placing a "1" at the location corresponding to the value of the intermediate exponent, with any leading zeros as necessary. The following Table 1 shows exemplary LZO's for double-precision computations (the value "X" indicates the bit could be either 1 or 0):

TABLE 1

| Intermediate Exponent (hexadecimal) | Leading Zero Overlay (106 bits) |
|---|---|
| 000 | 1 XXXXXXX ... XXXXXXXXX |
| 001 | 0 1 XXXXXX ... XXXXXXXXX |
| 002 | 0 0 1 XXXXX ... XXXXXXXXX |
| 003 | 0 0 0 1 XXXX ... XXXXXXXXX |
| 004 | 0 0 0 0 1 XXX ... XXXXXXXXX |
| 005 | 0 0 0 0 0 1 XX ... XXXXXXXXX |
| 006 | 0 0 0 0 0 0 1 X ... XXXXXXXXX |
| . | . |
| . | . |
| . | . |
| 066 | 00000000 ... 000001XXX |
| 067 | 00000000 ... 0000001XX |
| 068 | 00000000 ... 00000001X |
| 069 | 00000000 ... 000000001 |
| >069 | 00000000 ... 000000000 |

The appropriate LZO, based on the intermediate exponent, is combined in an "OR" operation with the data inputs from adder 222, i.e., the sum or carry. The result is then fed to a conventional LZA which determines the number of leading zeros to remove from the intermediate result. It can thus be seen that the LZO effectively limits the LZA to shifts of the intermediate result by an amount corresponding to the intermediate exponent. In this manner, the LZA never creates an exponent less than $E_{min}$ where $E_{min}$ is the minimum exponent value. If the intermediate exponent is greater than twice the fractional bits (e.g., 106 for double-precision fused multiply-add), then the final result of the floating-point operation cannot underflow and the LZO has no effect. Also, those skilled in the art will appreciate that the LZO has no effect if the sum and carry is also denormalized and has a specific exponent value of −001. For this example, Table 2 below illustrates alignment of the fractions, the intermediate results, and the final results for various A×C product fractions ("ACFrac") and B fractions ("BFrac"):

TABLE 2

| Aligned Fractions | Intermed. Result | Final Result |
|---|---|---|
| ACFrac = 11—⌐₁₁₁ ... | E = −001 | E = 001 I = 1 |
| BFrac = ... 0111—⌐₁₁ ... | F = 011X—⌐ₓₓₓ ... | (normalized) |
| ACFrac = 10—⌐ₓₓₓ ... | E = −001 | E = 001 I = 1 |
| BFrac = ... 0110—⌐₀ₓₓ ... | F = 010X—⌐ₓₓₓ ... | (normalized) |
| ACFrac = 10—⌐₀ₓₓ ... | E = −001 | E = 001 I = 0 |
| BFrac = ... 0101—⌐₀ₓₓ ... | F = 0011—⌐ₓₓₓ ... | (denormalized) |
| ACFrac = 01—⌐₀₀ₓ ... | E = −001 | E = 001 I = 0 |
| BFrac = ... 0100—⌐₁ₓₓ ... | F = 0001—⌐ₓₓₓ ... | (denormalized) |
| ACFrac = 00—⌐₀₀ₓ ... | E = −001 | E = 001 I = 0 |
| BFrac = ... 0100—⌐₀₁ₓₓ ... | F = 0000—⌐₀₁ₓ ... | (denormalized) |

In the above table, the carrot character "⌐" does not represent a bit, but rather marks the binary point of the A×C product fraction, which is two right of the product's most significant bit. However, because of denormalized operands, both bits to the left of the binary point may be zero. The character "I" represents the implicit bit which, in this example wherein B is denormalized, is always zero. The binary point of the A×C product fraction is offset from the implicit bit of the B fraction by two in each case since the exponents (−001 and 001) differ by two. The first two lines of Table 2 show the largest class of possible results value which is OR'ed with the LZO has a more significant bit than the LZO.

In case (1), where the operand B is denormalized and the intermediate product A×C exponent is less than zero, a different method is used to determine whether normalization is required and how much to shift the mantissa of the intermediate result. The shift amount is derived from the addend alignment amount, i.e., the difference between the intermediate exponent and the exponent of operand B, which was calculated by exponent calculator 208. This approach is referred to herein as alignment determined normalization (ADN). If alignment shifter 214 shifts the addend (left) an amount Y, then normalizer 232 shifts the result (right) the same amount Y, without regard to leading 1 bits. This shift value can be sent directly to the normalizer. Full normalization (from the LZA/LZO) would produce a result with an exponent which is less than 1 ($E_{min}$). With ADN, however, the final result may be normalized or denormalized, but either way the result exponent is still 001 (hexadecimal). The result's implicit bit distinguishes the two cases (I=0 for denormalized numbers; I=1 for normalized numbers). Since the exponent adjustment always matches the normalization amounts, the final result exponent will be 001 as desired. In other words, the exponent does not need to be forced to 001.

As a further illustration of the ADN technique, consider a denormalized operand B and an A×C product which that the ADN operation must be able to handle. Both produce normalized results. Subsequent lines show smaller exemplary results. As noted above, the A×C product exponent is −001 for all cases shown in the table.

Figure 4:
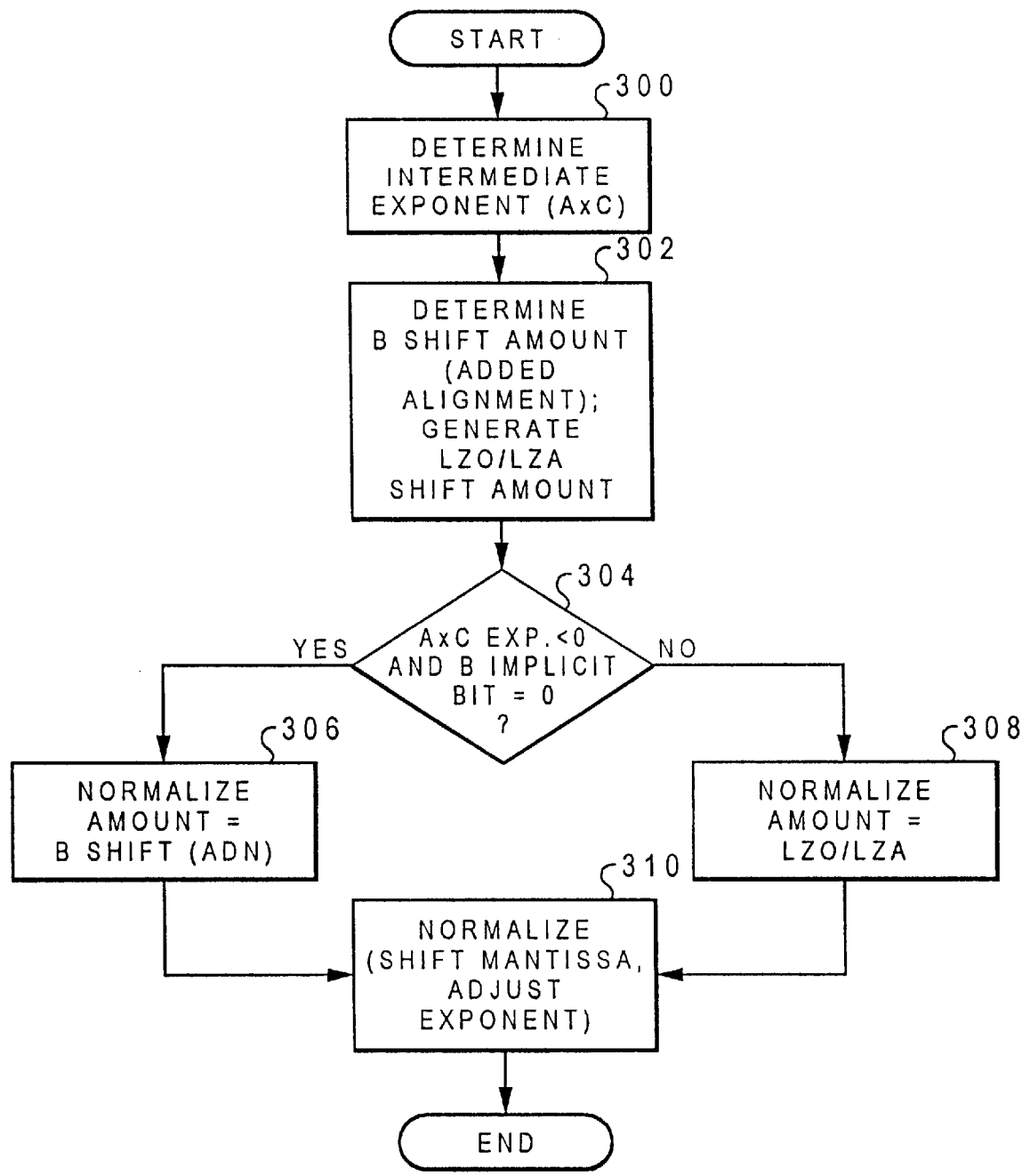
FIG. 4 is a flowchart depicting a method of processing denormalized floating-point numbers according to a preferred embodiment of the present invention.

The present invention may further be understood with reference to the flowchart of FIG. 4. The present invention first determines the exponent of the intermediate product A×C (300). The hardware then determines the B (addend) shift amount and generates the LZO/LZA amount (302). Although only one of these parameters is necessary for normalization, according to the particular case involved, both operations occur simultaneously in the hardware. The B implicit bit and the A×C exponent then are examined to determine which case is present (304). For example, with double-precision numbers, if the A×C exponent is less than zero and the addend implicit bit is equal to zero, then the normalize shift amount should be based on ADN (306). Otherwise, the normalize shift amount is based on the LZO/LZA amount (308). After determining the appropriate normalize shift amount, this value is fed to the normalizer which appropriately shifts the mantissa of the intermediate result and adjusts its exponent (310).

The foregoing technique for modifying normalization by the LZA may either be incorporated into the LZA hardware, or may be incorporated into a separate logic unit having inputs which receive the exponents of B and the A×C product, the intermediate exponent, and the addend alignment amount. The specific construction of this logic may vary but is within the skill of the art to construct upon reference to the present disclosure. This novel approach to handling denormalized numbers avoids the extra cycles used by unnecessary prenormalization and denormalization, and further avoids stalling subsequent instructions while the hardware determines if an underflow condition will occur, thereby improving processor performance for floating-point operations.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. A method of processing an instruction in a floating-point processor, the instruction having a plurality of operands including an addend, wherein at least one of the operands is a normalized floating-point number, the method comprising the steps of:

calculating an intermediate result based on the operands, the intermediate result having a mantissa and an exponent;

determining a normalization shift amount to shift the mantissa of the intermediate result to obtain a final result, the shift amount being selected to directly produce a denormalized result, said determining step including the step of selecting a leading zero overlay used to derive the normalization shift amount, the leading zero overlay being based on the exponent of the intermediate result;

shifting the mantissa by the normalization shift amount; and adding the normalization shift amount to the exponent.

2. The method of claim 1 wherein the normalization shift amount is selected to produce a normalized final result unless a normalized final result would produce a negative exponent.

3. The method of claim 1 wherein:

the addend is a denormalized floating-point number;

said calculating step includes the step of deriving an addend alignment amount by taking the difference between the exponent of the intermediate result and an exponent of the addend; and said determining step is accomplished by setting the normalization shift amount equal to the addend alignment amount.

4. The method of claim 1 wherein the final result is a denormalized floating-point number, and further comprising the step of storing the final result in a floating-point register.

5. The method of claim 1 wherein said step of selecting a leading zero overlay includes the step of determining the number of bits in a fractional portion of the format of the operands.

6. The method of claim 1 wherein:

the operands include first and second operands which are multiplied to produce a product;

said calculating step includes the step of deriving sum and carry values associated with the product; and the leading zero overlay is used to derive the normalization shift amount by combining the leading zero overlay in an OR construct with the sum and carry values.

7. The method of claim 4 wherein the final result is indicated as being denormalized by providing an exponent value of 001 hexadecimal with an implicit bit equal to zero.

8. A floating-point processor for a computer system, comprising:

means for multiplying first and second floating-point operands to obtain a product;

means for adding a third floating-point operand to the product to obtain an intermediate result having a mantissa and an exponent; and means for shifting the mantissa of the intermediate result by a normalization shift amount to obtain a final result, the shift amount being selected to avoid producing a final result having a negative exponent, wherein, when either the product or the third operand is a normalized floating-point number, said mantissa shifting means selects a leading zero overlay used to derive the shift amount, the leading zero overlay being based on the exponent of the intermediate result.

9. The floating-point processor of claim 8 wherein said normalization shift amount is selected to produce a normalized final result unless a normalized final result would produce a final result having a negative exponent.

10. The floating-point processor of claim 8 wherein:

said adding means derives an addend alignment amount by taking the difference between the exponent of the intermediate result and an exponent of the third operand; and if the product is a denormalized floating-point number and the third operand is a denormalized floating-point number, said mantissa shifting means sets said normalized shift amount equal to the addend alignment amount.

11. The floating-point processor of claim 8 further comprising a plurality of floating-point registers for storing normalized and denormalized floating-point numbers.

12. The floating-point processor of claim 8 wherein:

said first, second, and third operands have a format which includes a plurality of mantissa bits; and said leading zero overlay has a number of bits equal to twice the number of said mantissa bits.

13. The floating-point processor of claim 8 wherein:

said multiplying means derives sum and carry values associated with the product; and said mantissa shifting means derives the shift amount by combining said leading zero overlay in an OR operation with said sum and carry values.

14. The floating-point processor of claim 11 wherein a final result is indicated as being denormalized by providing an exponent value of 001 hexadecimal with an implicit bit equal to zero.

* * * * *